Feb. 15, 1927.
G. H. FORSYTH
WHEEL RIM ASSEMBLY
Original Filed April 3, 1922
1,617,999
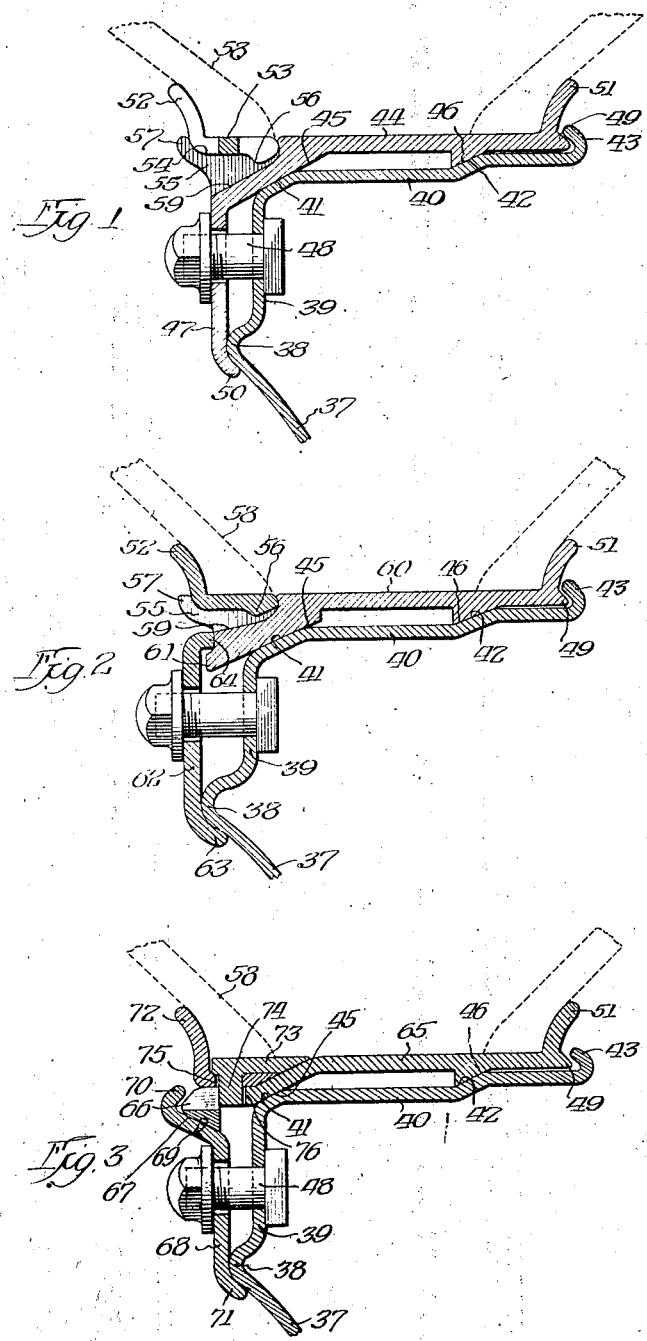

Patented Feb. 15, 1927.

1,617,999

UNITED STATES PATENT OFFICE.

GEORGE H. FORSYTH, OF SAN FRANCISCO, CALIFORNIA, ASSIGNOR TO MOTOR WHEEL CORPORATION, OF LANSING, MICHIGAN, A CORPORATION OF MICHIGAN.

WHEEL-RIM ASSEMBLY.

Original application filed April 3, 1922, Serial No. 549,219. Divided and this application filed June 9, 1923. Serial No. 644,304.

My invention relates to disk wheel construction and has reference particularly to the disk and rim assembly, this application being a division of my copending application Serial No. 549,219.

The objects of the invention are to provide a secure connection between the wheel disk and rim, whether of the demountable or quick-detachable type, or a combination of the two, whereby the rim may be demounted with the tire thereon and the tire can be detached from the rim when on or off the wheel.

Other characteristic features and advantages flowing from the invention will be made apparent hereinafter.

To the end that the invention may be readily understood and its advantages appreciated, I have illustrated several embodiments of the same in the accompanying drawing serving as a basis for a somewhat detailed description in this specification.

In the drawings—

Figs. 1, 2 and 3 are fragmentary radial sections through the peripheral portion of the wheel illustrating the invention as embodied in different forms of rim and disk assembly.

Having reference now to the drawing which illustrates three embodiments of the invention as relates to disk and rim assembly, it will be observed that in each of the figures the disk 37 in its peripheral portion is shown as provided with a bead 38, a substantially radial portion 39 and a substantially axial portion 40 forming a felly comprising portions slightly offset with intermediate inclined outer face portions 41 and 42 with a terminal inturned lip or flange 43. The illustrated specific contour of the disk adjacent and including its felly portion is not essential to the invention but is susceptible of modification without departure from the essence of the invention as defined in the claims. In each of these figures the wheel is shown as assembled with a rim which combines the characteristics of a demountable rim and of a quick detachable rim, enabling the rim and tire to be removed together from the wheel and also permitting of the tire being detached from the rim while on the disk or after the removal of the rim.

In Fig. 1 the rim 44 is shown as having an inner face inclined at 45 and at 46 for cooperation respectively with the inclined surfaces 41 and 42 of the felly, the rim also being provided with an inwardly extending radial flange 47 by means of which the rim is demountably assembled with the disk by means of the rim securing bolts 48. Not only is the rim snugly assembled with the disk as it is forced laterally onto the felly by means of the bolts and the engagement with the inclined surfaces 41 and 42 of the inclined surfaces 45 and 46, but the rim and disk may become interlocked radially by the lip or flange 43 taking over the rim edge 49 and by the inner edge 50 of the rim flange 47 taking over the bead or shoulder 38 of the disk.

It will be observed that the constrictive action of the laterally assembled rim upon the felly and disk places and retains the former under outwardly directed radial expansion and the latter under inwardly directed radial compression, this reaction maintaining the rim and disk under stress and thereby enhancing the resistance of the wheel to deformation and increasing its capacity for recovery from momentary distortion under abnormal stress. It will be noted also that the radial interlock does not function as the rim and disk are being assembled so as to interfere with the wedging relation of the felly, rim and rim-retaining bolts and clips, but any tendency of the rim diameter to enlarge under the wedge action is limited by the interlock and a secure assemblage of disk and rim is assured, while the wedge relationship between the interlocking portions, whether occurring through expansion or abnormal difference in size between the disk periphery and rim, prevents any lost motion.

The rim 44 is shown as provided at its rear edge with a fixed tire-retaining bead or flange 51 and at its front edge with a removable tire-retaining bead or flange 52. The latter is preferably in the form of a split ring, one end of which has a projecting stud 53 for engagement with a corresponding recess of the adjacent end to prevent lateral displacement of the two ends. The removable bead 52 is seated within a shallow recess 54 of the rim portion 55 and has an inwardly projecting portion 56 seated within a corresponding depression of the rim portion 55, the interlocking of the two at this point as also behind the lip 57 preventing lateral displacement of the removable bead with reference to the rim. The usual pneumatic tire represented in dotted lines at 58 overlies the retaining bead 52 and the pressure of the air in the inflated tire holds the removable bead firmly against accidental displacement. The rim portion 55 is slotted at intervals as indicated at 59 for the insertion beneath the bead or flange 52 of a suitable tool such as a screw-driver by means of which the bead may be lifted clear of the interlock at 56 and 57 and moved laterally out of engagement with the rim; whereupon the tire may be disassembled from the rim by a lateral movement to the front.

In Fig. 2 the rim 60 is substantially the same as that shown and described with reference to Fig. 1, with the exception that instead of being provided with an integral flange 47 the forward edge of the rim terminates inwardly in a lip 61 and a removable rim-retaining member in the form of a clip 62 is employed instead of the integral rim-retaining flange 47 of Fig. 1.

This clip 62 may be in the form of an annulus, integral or split, or it may be composed of a number of narrow individual clips disposed at intervals about the wheel periphery. The inner edge 63 of the clip 62 takes over the bead or shoulder of the disk as in the former case and the outer edge of the clip projects rearwardly at 64 and takes over the lip 61 of the rim.

Here it will be observed that as in Fig. 1, the rim has a constructive and interlocked relation with the disk and the removable tire-retaining bead may be quickly detached by means of a suitable tool from its lateral interlocked engagement with the rim proper.

In Fig. 3 the rear half of the rim 65 is substantially the same as that illustrated and described with reference to Figs. 1 and 2, but the forward portion, while the same in principle, differs in constructional details, the rim proper terminates at its forward edge in a portion 66 having an inner face 67 inclined to the axis of the wheel, the rim-retaining clip 68 having a corresponding inclined face 69 for engagement therewith and also a rearwardly projecting hooked portion 70 for taking over the rim portion 66 while the inner edge of the clip at 71 takes over the shoulder or bead 38 of the disk. It will be observed that here also there is a wedging and also a radial interlocking relation of the rim and disk.

In this form of construction the removable tire-retaining bead or flange 72 rests upon a substantially flat portion of the rim and is interlocked therewith against accidental lateral displacement by one or more key members 73 which overlie the base of the bead or flange beneath the tire 58, the key having a stud 74 projecting inwardly through an opening 75 of the bead or flange into an opening 76 of the rim. When the clip 68 is removed, a suitable tool may be brought to bear against the lower face of the stud 74 through a small lateral opening at 66 to lift the same out of the rim whereupon the key 73 and the bead or flange 72 may be removed laterally and the tire disassembled.

Obviously, the rim portion 66 may be slotted at points corresponding to key lugs 74 to provide for release of the tire while the rim clips 68 remain in position.

I claim:

1. In a wheel, a disk body having a peripheral flange with an outer surface portion inclined to the wheel axis, a rim having an inner surface for engagement with the inclined flange surface by lateral movement, and a rim positioning clip to force the rim upon the flange to effect a snug engagement of the rim and flange, the disk and rim having portions arranged to interlock radially.

2. In a wheel, a disk body having a peripheral flange with an outer surface portion inclined to the wheel axis, a rim having an inner surface for engagement with the inclined flange surface for lateral movement, and a rim positioning clip to force the rim upon the flange to effect a snug engagement of the rim and flange, the flange and rim-retaining clip having terminal portions arranged to take over the opposite sides of the rim and positively interlock the disk and the rim.

3. In a wheel, a body having a peripheral flange with an outer surface portion inclined to the wheel axis, a rim having an inner surface for engagement with the inclined flange surface by lateral movement, and rim positioning means to force the rim upon the flange to effect a snug engagement of the rim and flange, the wheel body and rim having interlocking portions arranged to engage upon abnormal expansion of the rim relative to the wheel periphery.

4. In a wheel, a disk body having a peripheral portion arranged to support a rim, a rim arranged to be mounted upon the disk periphery, coacting surfaces of the rim and disk inclined to the wheel axis whereby to provide for the assemblage of the rim and disk by lateral wedging movement, and rim positioning means to force the rim upon the disk, the disk and rim having interlocking portions arranged to engage when an abnormal difference occurs in the relative diameter of the rim and disk periphery.

5. In a wheel, a disk body having a peripheral portion arranged to support a rim, a rim arranged to be mounted upon the disk periphery, coacting surfaces of the rim and disk inclined to the wheel axis whereby to provide for the assemblage of the rim and disk by lateral wedging movement, and rim positioning means to force the rim upon the disk, the disk and rim having interlocking portions with a wedge relationship and arranged to effect a wedge interlocked engagement when an abnormal difference occurs in the relative diameter of the rim and disk periphery.

In testimony whereof I have hereunto subscribed my name.

GEORGE H. FORSYTH.